(12) United States Patent
Gomez et al.

(10) Patent No.: US 11,767,176 B1
(45) Date of Patent: Sep. 26, 2023

(54) MONITORING SYSTEM TO DETECT OBJECTS ON CONVEYOR SYSTEM

(71) Applicant: Amazon Technologies, Inc., Seattle, WA (US)

(72) Inventors: German Valle Gomez, Viladecavalls (ES); Jorge Munoz Parra, Gandia (ES)

(73) Assignee: Amazon Technologies, Inc., Seattle, WA (US)

(*) Notice: Subject to any disclaimer, the term of this patent is extended or adjusted under 35 U.S.C. 154(b) by 92 days.

(21) Appl. No.: 17/347,922

(22) Filed: Jun. 15, 2021

(51) Int. Cl.
*B65G 43/08* (2006.01)

(52) U.S. Cl.
CPC ...... *B65G 43/08* (2013.01); *B65G 2203/0233* (2013.01); *B65G 2203/0291* (2013.01); *B65G 2203/044* (2013.01); *B65G 2811/095* (2013.01)

(58) Field of Classification Search
CPC .............. B65G 47/08; B65G 2811/094; B65G 2203/044; B65G 2203/0291; B65G 43/08
See application file for complete search history.

(56) References Cited

U.S. PATENT DOCUMENTS 4,722,169 A * 2/1988 DeSantis ............... F27D 3/0021 53/251
5,582,796 A * 12/1996 Carey ................. G01N 35/1002 422/549
9,470,510 B2 * 10/2016 Wilson ................. B65G 47/846
2021/0122589 A1 * 4/2021 Griggs ................... B65G 67/24

OTHER PUBLICATIONS

Lindorfer, Stefan, Connecting Device for Assembling a Holder for Components of a Conveyor Device, and Conveyor Device for Transporting Unit Loads, Dec. 2, 2021, PCT (Year: 2021).*

* cited by examiner

*Primary Examiner* — Gene O Crawford
*Assistant Examiner* — Lester Rushin, III
(74) *Attorney, Agent, or Firm* — Lee & Hayes, P.C.

(57) ABSTRACT

A sensor-based monitor system for a conveyor belt station are described. A conveyor device in the conveyor belt station includes a conveyor belt that transports containers. A bracket is connected a surface of the conveyor device, a first sensor device is connected to the bracket, and a second sensor device is connected to the bracket. A conveyor controller is configured to control the motor, which causes the conveyor belt to move based on the first sensor device receiving a first light beam reflected by a corresponding first reflective surface and on the second sensor device receiving a second light beam reflected by a corresponding second reflective surface. An object, different from the containers, is detected on the conveyor belt based on the first sensor device receiving the first light beam and on the second sensor device ceasing to receive the second light beam.

20 Claims, 7 Drawing Sheets

OPERATING A CONVEYOR BELT BY CONTROLLING A MOTOR, THE CONVEYOR
BELT TRANSPORTING CONTAINERS
402

CAUSING THE MOTOR TO OPERATE BASED ON A FIRST SENSOR RECEIVING A
FIRST LIGHT BEAM AND A SECOND SENSOR RECEIVING A SECOND LIGHT BEAM
404

DETECTING AN OBJECT BASED ON THE FIRST SENSOR RECEIVING THE FIRST
LIGHT BEAM AND THE SECOND SENSOR CEASING TO RECEIVE THE SECOND
LIGHT BEAM
406

CAUSING THE MOTOR TO CEASE BASED ON DETECTING THE OBJECT
408

MONITORING SYSTEM TO DETECT OBJECTS ON CONVEYOR SYSTEM

BACKGROUND

Modern shipping, sorting, or processing facilities often utilize conveyor systems, such as belts, rollers, and the like, to transport packaged goods from one location to another. The packaged goods may be transported for shipment and/or distribution. Although this approach is robust and efficient, it can be difficult to detect small objects on, in, or around the conveyor systems. As such, the undetected objects can cause damage to various components of the conveyor systems. Moreover, the undetected objects can interfere with, and cause misalignment of, package containers placed on belts of the conveyor systems. The misalignment can cause the package containers to collide with other objects or portions of the systems. Additionally, the undetected objects may be incidentally transported by the conveyor systems to other systems, such as sorters, causing damage to the other systems. Alterations or interruptions to operation of the systems may also pose inherent safety risks.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

This disclosure is directed to techniques for detecting objects moving on conveyor systems within a material handling facility. The objects may be detected by sensors connected to brackets mounted on the conveyor systems. The sensors can detect different types of objects to distinguish between package containers (or bins), items that are intended to be transported using the conveyor systems (e.g., products, packages, etc.), and small objects that are not intended to be transported using the conveyor systems. Such small objects may include items/packages that have fallen out of a container/bin, loose parts (e.g., nuts, bolts, etc.) from the conveyor systems (or other systems, such as an overhead system), and objects inadvertently placed on the conveyor systems (e.g., a screwdriver, a mobile device, a pencil, etc.) by individuals or automated mechanisms (e.g., robots, robotic arms, etc.). The brackets may include components to protect the sensors from damage due to misaligned containers that are transported on the belts. Controllers with high processing speeds may be utilized to process data captured by the sensors. Accordingly, the different types of objects may be accurately detected while the objects are being transported at high speeds.

In some instances, the material handling facility may represent a building, center, or hub where item(s) are sorted, packaged, or inducted for shipment. The material handling facility may include any number of conveyor systems, such as chutes, rollers, belts, wheels, and so forth for transporting the packages from one location to another. For example, as item(s) are packaged for shipment, the packages may travel along one or more conveyor systems for sorting to their final destination. However, it is to be understood that the systems and methods discussed herein may be implemented within other environments and/or in which item(s) other than packages are transported (e.g., goods, commodities, etc.).

The brackets may be connected to different sides of the conveyor systems. The brackets may include metal rods that are rigid for maintaining positions of the sensors (e.g., transceivers) and reflective surfaces. The rods may be connected to plates that securely connect the brackets to the conveyor systems and provide protection for the transceivers and reflective surfaces. The plates may have openings or cut-outs, through which cables connected between controllers and the transceivers can be positioned.

The transceivers and the reflective surfaces may be utilized to detect objects that are being transported by the conveyor systems. The transceivers and the reflective surfaces may be connected to the rods of the brackets. The transceivers can emit beams of light that are interrupted by objects passing between the transceivers and reflective surfaces. Transceivers and reflective surfaces connected to the rods at higher positions may be utilized to detect taller objects than transceivers and reflective surfaces connected to the rods at lower positions. A height of the transceivers and reflective surfaces connected at the higher positions can be equal to or less than a height of a container or bin that contains items (e.g., packages). This height may also correspond to items being transported that have standardized dimensions. A height of the transceivers and reflective surfaces connected at the lower positions can be equal to or less than a height of a small object. The position and height of the transceivers and corresponding reflective surfaces may be variable to account for different sizes of containers, bins, object, etc. that are being transported by the conveyor systems.

The controllers may be connected to sides of the conveyor systems. The controllers may connected to the cables, which may be connected to the transceiver. The controllers may supply power to the transceivers and receive signals from the transceivers. The signals received from the transceivers may be utilized by the controllers to process data captured by the transceivers. The transceivers may send signals indicating that objects are not detected based on the light beams being received by the transceivers. The controllers may detect containers and small objects based on detecting whether lights beams are interrupted, which may be indicated by a light beam being emitted by the transceiver and a corresponding light beam not being received by the transceiver. In one scenario, the emitted light beam is not received and reflected by the corresponding reflective surface on the opposite side of the conveyor device (e.g., the conveyor belt) in the conveyor system, which prevents the transceiver from receiving the light beam. Here, something (e.g., a bin, container, or object) has blocked the light beam from being reflected by the corresponding reflective surface. In another scenario, the corresponding reflective surface receives and reflects the light beam but the transceiver does not receive the reflected light beam. This likely results from something (e.g., a bin, container, or object) blocking the reflected light beam after it has been reflected. The controllers may detect the containers based on light beams being interrupted for both the transceivers connected at the higher positions and the transceivers connected at the lower positions. The controllers may detect the small objects based on light beams being interrupted by the transceivers connected at the lower positions, but not the transceivers connected at the higher positions.

The system and methods disclosed herein therefore provide techniques for increasing equipment reliability and workplace safety within a material handling facility. The sensors are arranged at different heights to monitor objects of different heights. In such instances, actions may be taken based on detections of small objects that are unrelated to shipping, sorting, or processing of packages. Such actions may protect operators from injury or harm, and/or prevent damage to equipment and/or packages. Accordingly, safety and productivity within the material handling facility may be increased.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

Figure 1:
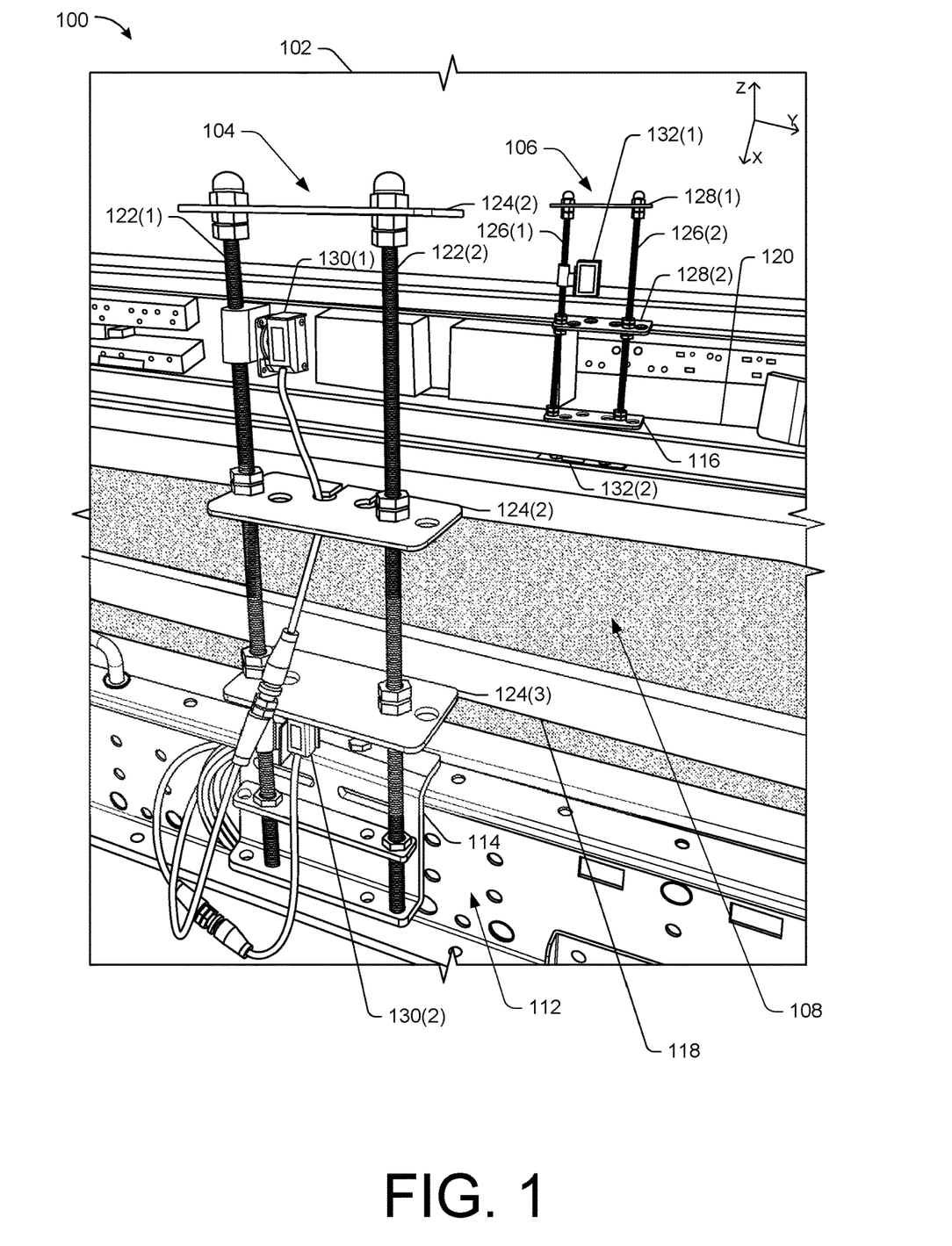
FIG. 1 illustrates an example environment that includes a conveyor station for detecting objects on a conveyor device.

FIG. 1 illustrates an example environment that includes a conveyor station 100 for detecting objects on a conveyor device 102 (an example of conveyor device 502 described below in connection with FIG. 5). The conveyor station 100 may include a bracket 104 (e.g., a first bracket) positioned at a first side of the conveyor device 102. The bracket 104 may be connected to a first side surface of the conveyor device 102. The conveyor station 100 may include a bracket 106 (e.g., a second bracket) positioned at a second side of the conveyor station 100. The bracket 106 may be connected to a second side surface of the conveyor device 102. Although two brackets are connected to the conveyor system as discussed in this disclosure, it is not limited as such. Any number of brackets may be connected to the conveyor system.

The conveyor station 100 may include a belt 108 positioned at (e.g., above) a top surface of the conveyor device 102. In some examples, the belt 108 may be positioned on a top surface of a frame (e.g., a metal frame) of the conveyor device 102. The top surface of the frame of the conveyor device 102 may be implemented, and referred to herein, as the top surface of the conveyor device 102, The belt 108 may be implemented, and referred to herein, as the top surface of the conveyor station 100. The belt 108 may be moveable such that it transports containers, bins, objects, packages, etc. in a particular direction between a first end and the second end of the conveyor device 102. The conveyor station 100 may include to a panel assembly 112. In some examples, the panel assembly 112 (e.g., a portion (e.g., a panel) (e.g., a first surface) of the panel assembly 112) may be implemented as the first side surface of the conveyor device 102. In those examples, the panel assembly 112 may be integrated as part of the conveyor device 102. In other examples, the panel assembly 112 may be separate from, and connected to, the conveyor device 102.

Although the conveyor station 100 includes the belt 108 as discussed in this disclosure, it is not limited as such. The conveyor station 100 may include one or more of the belt 108, roller(s), wheel(s), and pulley(s) that are utilized to transport the containers, bins, objects, packages, etc., along a length of the conveyor device 102. The one or more of the belt 108, roller(s), wheel(s), and pulley(s) may form a deck (e.g., also referred to as the top surface of the metal frame of the conveyor device 102) associated with the conveyor station 100, along which the containers travel.

The bracket 104 may include a plate 114 (e.g., a first mounting plate). The plate 114 may be relatively straight or curved (e.g., have one or more portions (e.g., a lower portion, a middle portion, and an upper portion) connected together via bent portions) to conform to one or more portions of the conveyor device 102. The bracket 104 may be connected to the first side surface of the conveyor device 102 (e.g., the panel assembly 112), via the plate 114. For the purposes of this disclosure, the bracket 104 may include any number of plates 114, or may not include any plates 114 in some instances The bracket 106 may include a plate 116 (e.g., a second mounting plate). The plate 116 may be implemented similarly as for the plate 114. For the purposes of this disclosure, the bracket 106 may include any number of plates 116, or may not include any plates 116 in some instances.

The conveyor station 100 may include a rail 118 (e.g., a first rail) positioned at a first side of the conveyor station 100, and a rail 120 (e.g., a second rail) positioned at a second side of the conveyor station 100. The rail 118 may be connected to the conveyor device 102. A first end of the rail 118 may be connected to the first end of the conveyor device 102. A second end of the rail 120 may be connected to the second end of the conveyor device 102. A portion of the rail 120 (e.g., a second side surface of the rail 120) may be implemented as the second side surface of the conveyor device 102. The bracket 106 may be connected to the second side surface of the conveyor device 102 (e.g., the rail 120), via the plate 116. The rails 118 and 120 may extend along a length of the conveyor device 102 and may keep containers, bins, objects, packages, etc. moving along the belt 108 in a particular direction. The rails 118 and 120 may also prevent containers, bins, objects, packages, etc. from falling off the conveyor device 102 or from becoming misaligned, which could potentially cause injury to personnel, cause damage to the conveyor system, cause jams, and so on.

Although a bracket (e.g., the bracket 104) is connected to a panel assembly (e.g., the panel assembly 112) at the first side of the conveyor station, and a bracket (e.g., the bracket 106) is connected to a rail (e.g., the rail 120) at the first side of the conveyor device 102 as discussed in this disclosure, it is not limited as such. Any of the bracket(s) (e.g., the bracket 104 and/or the bracket 106) can be connected to any portion (e.g., any rail, panel, etc.) of the conveyor station that is capable of stably supporting the brackets 104/106. As such, any portion of the of the conveyor station that is connected to the bracket 104 positioned at the first side of the conveyor station may be implemented as the first side surface. Any portion of the of the conveyor station that is connected to the bracket 106 positioned at the second side of the conveyor station may be implemented as the second side surface.

Although a bracket (e.g., the bracket 104) is referred to as being connected to the first side surface of the conveyor device, and a bracket (e.g., the bracket 106) is referred to as being connected to the second side surface of the conveyor device, as discussed in this disclosure, it is not limited as such. Any of the brackets can be connected to any number of different portions of the conveyor device. In some examples, the bracket 104 may be connected to the panel (e.g., the first side surface) of the panel assembly (e.g., the panel assembly 112), as well as one or more other panels (e.g., a top panel, a bottom panel, etc.) of the panel assembly. In some examples, the bracket 106 may be connected to the portion (e.g., the second side surface) of the rail (e.g., the rail 120) positioned at the second side of the conveyor device, as well as one or more other portions (e.g., a top portion/surface, a bottom portion/surface, etc.) of the rail.

Although the terms "plate" and "panel" are discussed in various portions of this disclosure, it is not limited as such. The terms "plate" and "panel" are used for convenience and are interchangeable. Any number of plates/panels (e.g., one or more straight plates/panels and/or one or more plates/panels with bent portions) may be utilized in place of, and in a similar way, as any of the "plate(s)" or "panel(s)" discussed herein.

The bracket 104 may include one or more rods 122(1), 122(2) (collectively rods 122). The bracket 104 may include one or more plates 124(1), 124(2), 124(3) (collectively, plates 124).

The bracket 106 may include one or more rods 126(1), 126(2) (collectively rods 126). The bracket 106 may include one or more plates 128(1), 128(2) (collectively, plates 128).

Although a bracket (e.g., the bracket 104) that is connected to the first side surface of the conveyor device includes three plates, and a bracket (e.g., the bracket 106) that is connected to the second side surface of the conveyor device includes two plates as discussed in this disclosure, it is not limited as such. Any of the brackets connected to the conveyor device may include any number (e.g., 1, 2, 3, 4, etc.) of plates.

The conveyor station 100 may include one or more transceivers 130(1), 130(2) (collectively, transceivers 130) (examples of sensor device(s) 504 described below in connection with FIG. 5). The transceivers 130 may be connected to the rod 122(1) (and/or any of the plates). Each of the transceivers 130 may be positioned to emit a light beam across the top surface of the conveyor device 102. Poses of the transceivers 130 may enable the light beam to be emitted by each of the transceivers 130 in a direction (e.g., a direction along the x-axis), that is perpendicular to a direction (e.g., a direction along the y-axis) of the first side of the conveyor device 102. Each of the light beams may be emitted horizontally (e.g., in a horizontal direction, and within the x-y plane).

Figure 3A:
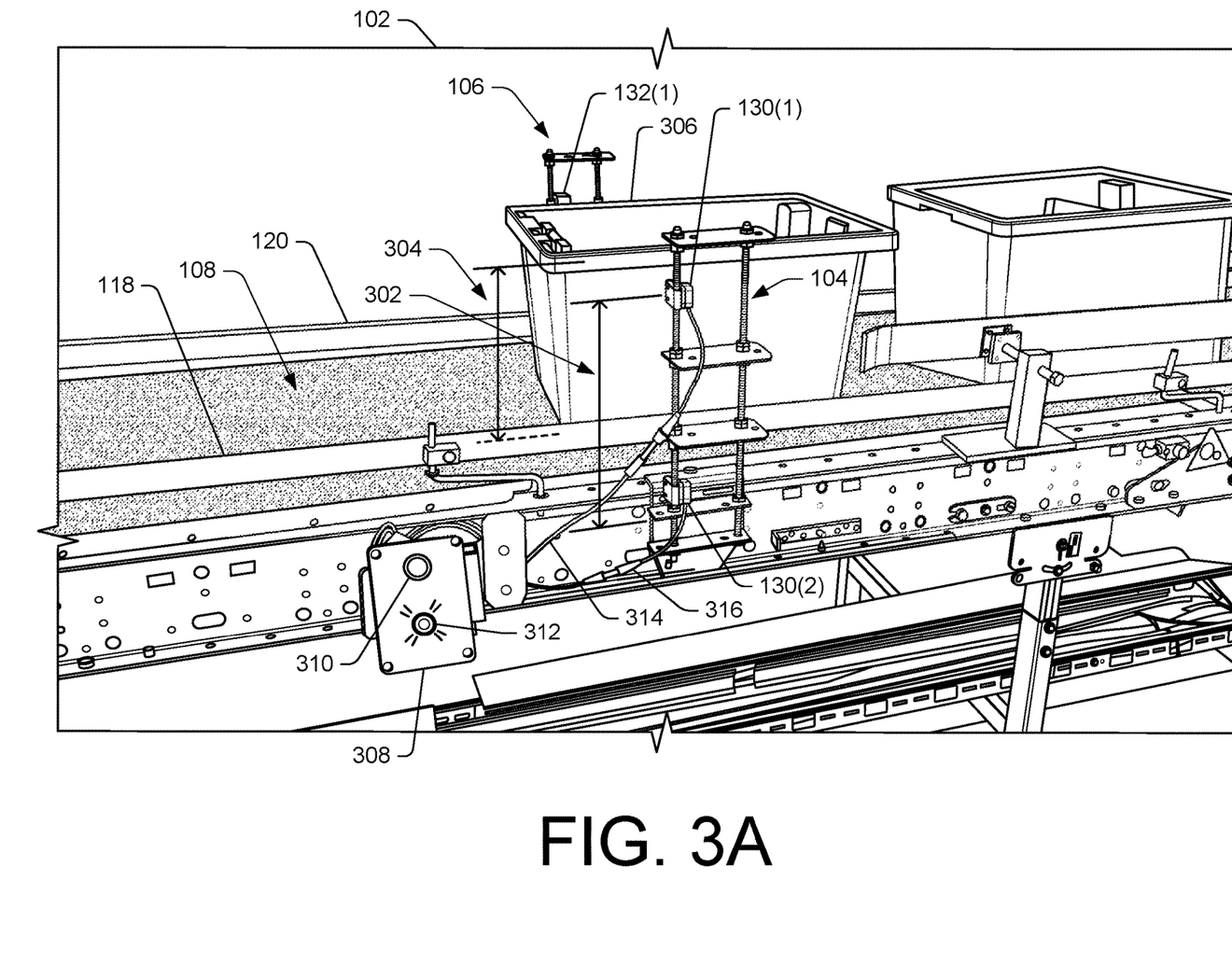
FIGS. 3A-3C illustrate example environments that include a conveyor station and different types of objects on the conveyor station.
Figure 3B:
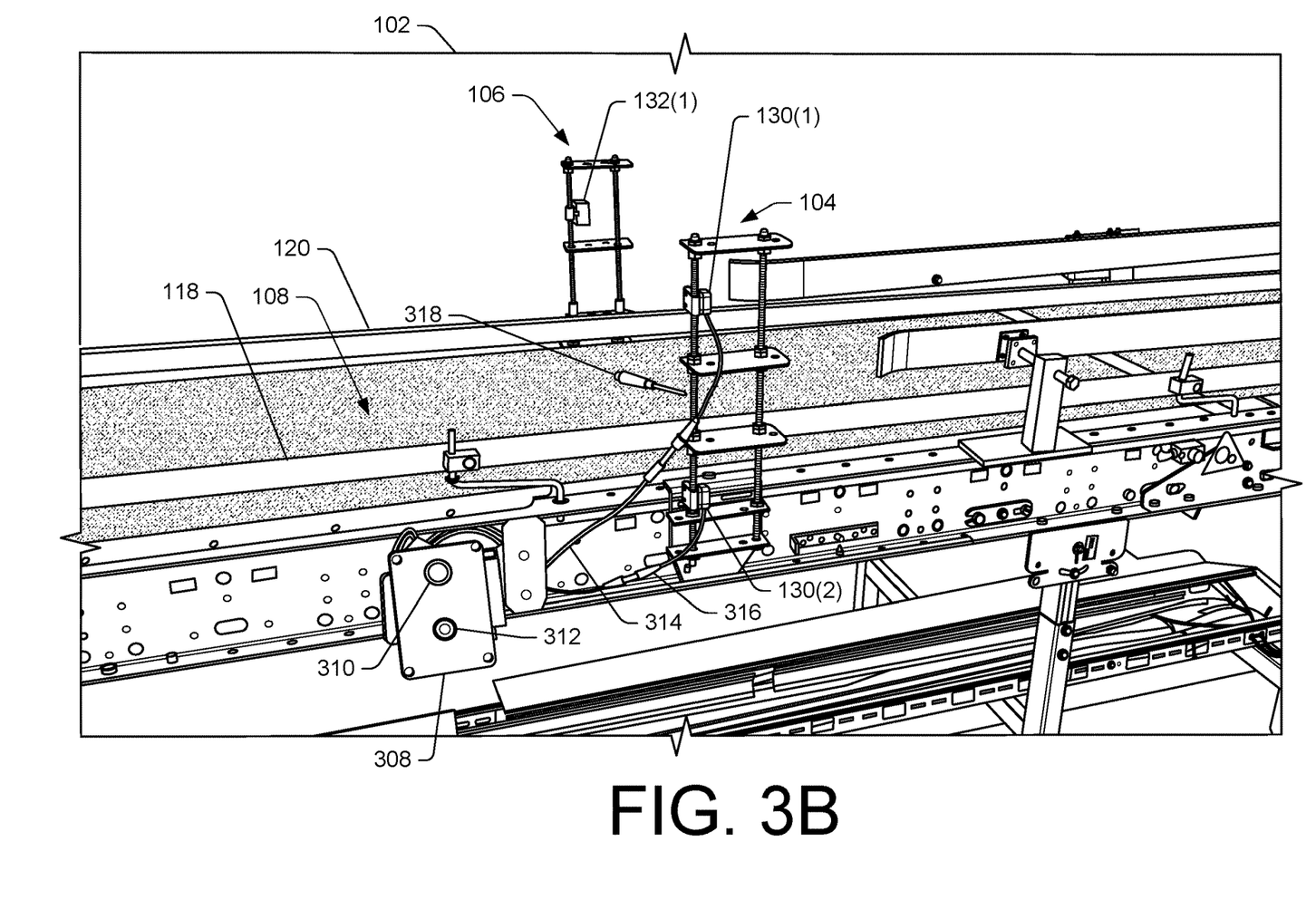
Figure 3C:
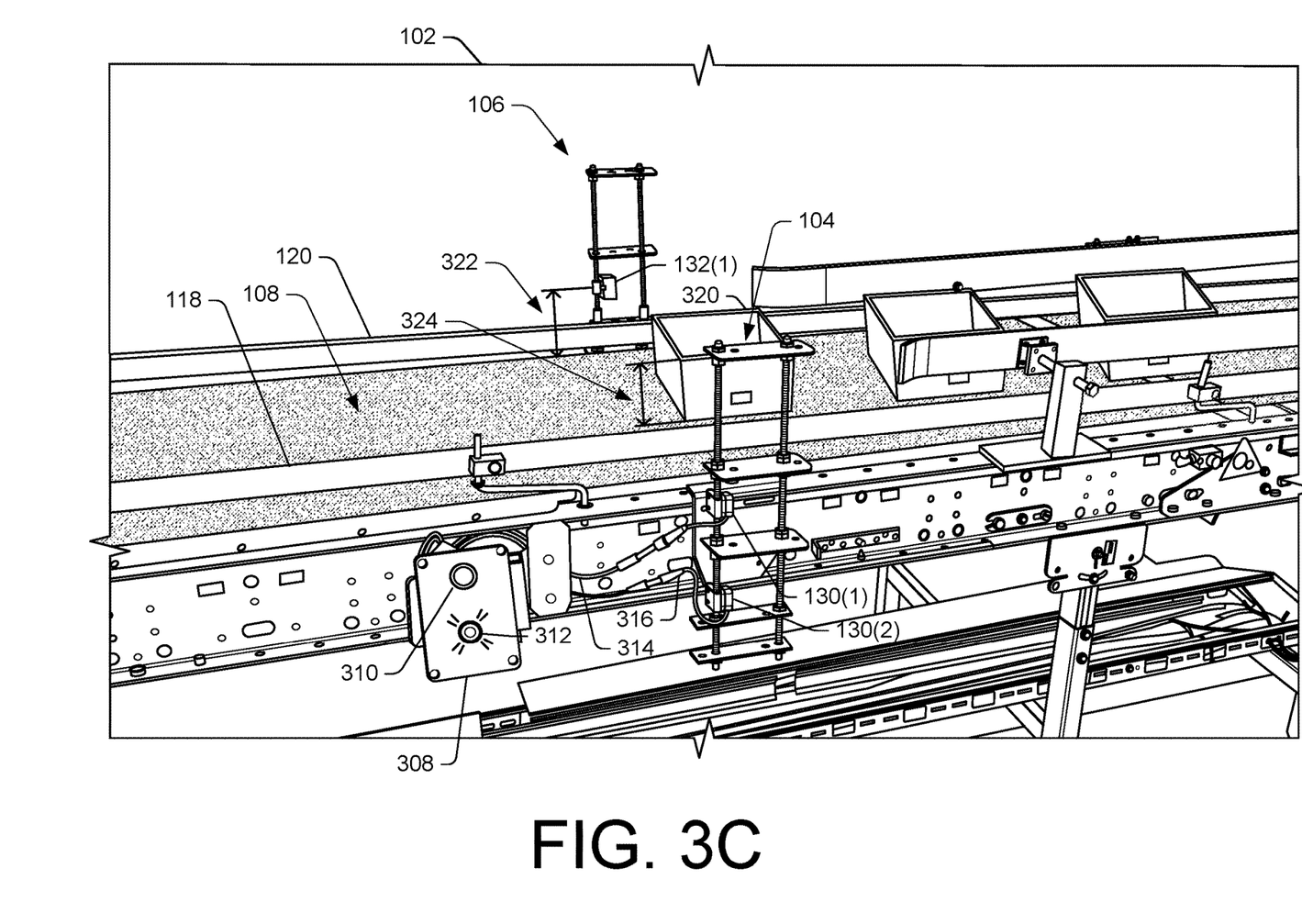

In some examples, the transceiver 130(1) may be at a height between the top surface of the conveyor device 102 and the transceiver 130(1)), allowing the transceiver 130(1) to emit the light beam above the belt 108 (e.g., the top surface of the conveyor station 100). The height of the transceiver 130(1) may allow the transceiver 130(1) to detect different types of objects (e.g., containers) on the belt 108, as illustrated in FIGS. 3A and 3C, and discussed below.

In some examples, the transceiver 130(2) may be at a height (e.g., a distance between the top surface of the conveyor device 102 and the transceiver 130(2), in a vertical direction (e.g., a direction along the z-axis)) allowing the transceiver 130(2) to emit the light beam above the belt 108 (e.g., (e.g., the top surface of the conveyor station 100). A distance (e.g., 5 millimeter (mm), 6 mm, 7 mm, etc.) between the transceiver 130(2) and the top surface of the conveyor device 102 may allow the transceiver 130(2) to emit the light beam above the belt 108. The height of the transceiver 130(2) may allow the transceiver 130(2) to detect small objects (also referred to herein as "unintended objects") on the belt 108, as illustrated in FIG. 3B, and discussed below. The height of the transceiver 130(2) may be a predetermined height. The predetermined height may be associated with a height of small objects that may result in damage to the conveyor station 100 or other devices by falling in and/or being trapped in the conveyor station 100 or other devices. The height of the transceiver 130(2) may be less than a height of the transceiver 130(1) (e.g., the height of the transceiver 130(1) may be greater than a height of the transceiver 130(2)).

In some examples, a distance between the top surface of the conveyor device 102 and the belt 108 may change while the belt 108 moves. The distance (e.g., 1 mm, 2 mm, 3 mm, 4 mm, etc.) between the top surface of the conveyor device 102 and the belt 108 at any time while the belt 108 is moving may depend on various physical characteristics of the belt 108, the conveyor station 100, and/or an environment in which the conveyor station 100 is positioned. The physical characteristics of the belt 108 may include a material, an age, an amount of wear, miscellaneous manufacturing variations and/or inconsistencies, etc. In some examples, the physical characteristics of the conveyor station 100 may include temperature, motion, etc. In some examples, the physical characteristics of the environment in which the conveyor station 100 is positioned may include an air temperature, a humidity level, an atmospheric pressure level, etc.

The conveyor station 100 may include one or more reflective surfaces 132(1), 132(2) (collectively, reflective surfaces 132, with the reflective surface 132(2) partially shown). In some examples, the reflective surface 132(1) (e.g., a first reflective surface) may be connected to bracket 106 (e.g., the rod 126(1) of the bracket 106). The reflective surfaced 132(1) may be connected to the rod 126(1), via a clamp, a mounting bracket, a plate, etc. The reflective surface 132(1) may be at the same height as the transceiver 130(1) (e.g., the distance between the top surface of the conveyor device 102 and the transceiver 130(1)). The reflective surface 132(1) being at the same height as the transceiver 130(1) may allow the reflective surface 132(1) to reflect the light beam transmitted by the transceiver 130(1). The reflective surface 132(1) may reflect the light beam back towards the transceiver 130(1). As a result, each of the transceivers 130 positioned on the first side of the conveyor device 102 has a corresponding reflective surface 132 positioned on the second side of the conveyor device 102. Light beams emitted by a transceiver across the belt 108 are reflected by the corresponding reflective surface 132 back towards the transceiver 130. The transceiver 130 detects the reflected light beam, indicating that no objects are between the transceiver 130 and the corresponding reflective surface 132 at that particular time. When a reflected light beam is not detected by the transceiver 130, something (e.g., a container, a bin, a package, an object, etc.) is moving past the transceiver 130/reflective surface 132. Continued emittance and reflection of light beams across the belt 108 allows for the system to determine if and when objects are being transported by the belt 108 at the particular position of the transceiver 130 and reflective surface 132.

In some examples, the reflective surface 132(2) (e.g., a second reflective surface) may be connected to bracket 106 (e.g., the rod 126(1) of the bracket 106). The reflective surface 132(2) may be connected to the rod 126(1), via a clamp, a mounting bracket, a plate, etc. The reflective surface 132(2) may be at the same height as the transceiver 130(2) (e.g., the distance between the top surface of the conveyor device 102 and the transceiver 130(2)). The reflective surface 132(2) being at the same height as the transceiver 130(2) may allow the reflective surface 132(2) to reflect the light beam transmitted by the transceiver 130(2). The reflective surface 132(2) may reflect the light beam back towards the transceiver 130(2).

Although various components (e.g., bracket(s), rod(s), plate(s), panel(s), transceiver(s), reflective surface(s), etc.) are connected to one another and other portions of the conveyor as discussed throughout this disclosure, it is not limited as such. Any of the components of the conveyor station discussed through the disclosure may be connected utilizing any types of fasteners (e.g., anchors, bolts, nails, nuts, pins, clips, rivets, rods, screws, sockets, clamps, hangers, washers, etc.), or any other connection techniques (e.g., welding, gluing, soldering, brazing, riveting, metal stitching, etc.).

Although the term "light beam" is used for convenience of explanation and simplicity through this disclosure, it is not limited to any particular type of emitted light. The term "light beam" may represent, or refer to, any directional projection of light energy radiating from a light source (e.g., the transceivers 130/132). The light beam may be any type of light beam formed by the transceivers 130/132 and/or any other transceivers in the conveyor station 100.

Although the term "transceiver(s)" is used for convenience of explanation and simplicity through this disclosure, it is not limited to any particular type of transceiver. The transceiver(s) in the conveyor station 100 may include transceiver(s) of any type. In some examples, the transceiver(s) may include one or more of infrared (IR) transceivers, light emitting diode (LED) transmitters, laser transceivers, optical transceivers of any type, etc. The transceiver(s) (e.g., the transceivers 130/132) may have single functionality or dual functionality. In some examples, the transceiver(s) may be utilized for emitting light (e.g., light beam(s)) and/or receiving light (e.g., light beam(s)). The transceiver(s) may emit light beam(s) and receive the light beam(s). The transceiver(s) may receive the light beam(s), based on the light beam(s) being reflected by reflective surfaces, back towards the transceiver(s).

Although container(s) are referred to as being transported by the conveyor station 100 as discussed in this disclosure, it is not limited as such. Any of the capabilities and/or functions discussed throughout this disclosure as pertaining to the container(s) may be implemented similarly for any type of object(s) (e.g., tote(s), bin(s), tray(s), package(s), box(es), bag(s), structure(s), etc.) suitable for (e.g., capable of) being transported by the conveyor station 100.

Figure 2:
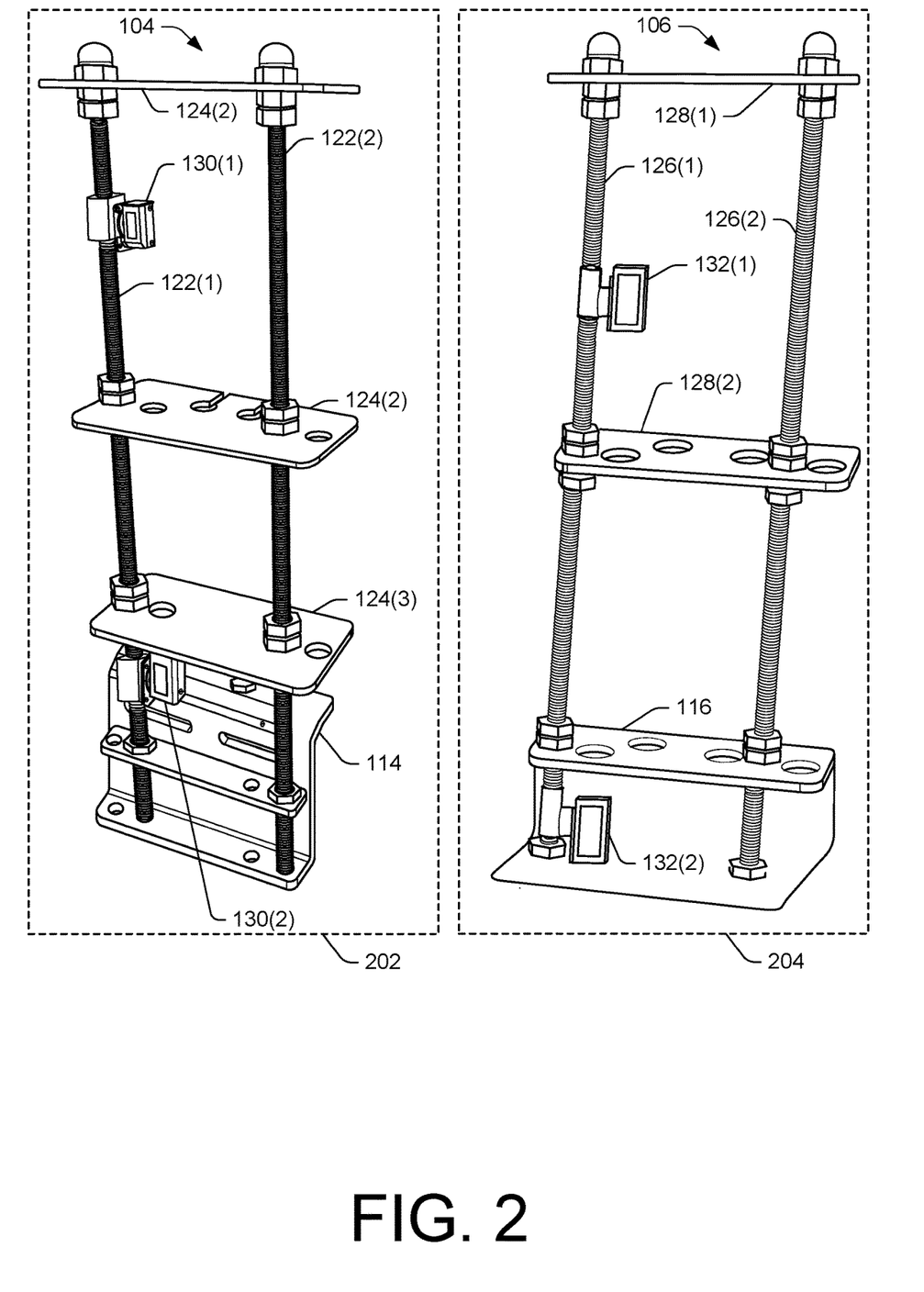
FIG. 2 is a close-up view of bracket assemblies for detecting objects on a conveyor system.

FIG. 2 is a close-up view of bracket assemblies 202 and 204 for detecting objects on a conveyor system. The bracket assembly 202 may include the bracket 104, as illustrated in FIG. 1, and discussed above. The bracket 104 may include the plate 114, the rods 122(1) and 122(2), and the plates 124(1), 124(2), and 124(3). The bracket assembly 202 may include the transceivers 130(1) and 130(2).

The bracket assembly 204 may include the bracket 106, as illustrated in FIG. 1, and discussed above. The bracket 106 may include the plate 116, the rods 126(1) and 126(2), and the plates 128(1) and 128(2). The bracket assembly 204 may include the reflective surfaces 132(1) and 132(2).

In some examples, positions of the transceiver(s) 130 and the reflective surface(s) 132 may be aligned with respect to position and height. By aligning the transceiver(s) 130 and the reflective surface(s) 132, light beam(s) emitted by the transceiver(s) 130 are reflected back by the reflective surface(s) 132, provided that nothing is in between. In those examples, a position and a height of the transceiver 130(1) may be aligned with a position and a height of the reflective surface 132(1). A position and a height of the transceiver 130(2) may be aligned with a position and a height of the reflective surface 132(2).

Based on the alignment between the transceiver 130(1) and the reflective surface 132(1), any light beam(s) transmitted by the transceiver 130(1) may be reflected back towards the transceiver 130(1) by the reflective surface 132(1). The light beam(s) are reflected back and received by the transceiver 130(1), unless an object (e.g., a container) interrupts the light beam(s). Based on the alignment between the transceiver 130(2) and the reflective surface 132(2), any light beam(s) transmitted by the transceiver 130(2) may be reflected back towards the transceiver 130(2) by the reflective surface 132(2). The light beam(s) are reflected back and received by the transceiver 130(2), unless an object (e.g., a container or a small object) interrupts the light beam(s).

FIGS. 3A-3C illustrate example environments that include a conveyor station (e.g., the conveyor station 100, as illustrated in FIG. 1, and discussed above) and different types of objects on the conveyor station. FIG. 3A illustrates the conveyor device 102, the brackets 104 and 106, the belt 108, the rails 118 and 120, the transceiver 130(1), and the reflective surface 132(1).

The transceiver 130(1) may be at a height 302 (e.g., a first height) that allows the transceiver 130(1) to detect one or more containers (e.g., totes) on the belt 108. The height 302 associated with the transceiver 130(1) may be the same as a height 304 associated with totes, containers, bins, etc. (e.g., a tote 306) that transport items or packages. In some examples, the height 304 may be a distance (e.g., a first distance) between the top surface of the conveyor device 102 and an upper portion (e.g., a lip) of the tote 306, in a vertical direction (e.g., a direction along the z-axis). In those examples, the height 304 may be the distance between the top surface of the conveyor device 102 and an upper portion (e.g., a middle location of the lip, having an equal distance from a bottom of the lip to a top of the lip) of the tote 306. In other examples, the height 304 may be a predetermined distance (e.g., 1 mm, 5 mm, 10 mm, 15 mm) below a top of the tote 306.

Although the term "tote" is utilized, for convenience of explanation, in FIG. 3A and throughout this disclosure, it is not limited as such. The term "tote" may refer to any bin, container, box, bag, tray, etc. that contains items/packages that are being transported. Moreover, in some instances, the "tote" may be an item or package itself, where the item/package has a standard or uniform size or dimensions.

The conveyor station 100 may include a controller 308. The controller 308 may be connected to a first side surface of the conveyor device 102. Although the controller is connected to the first side surface as discussed in this disclosure, it is not limited as such. The controller may be positioned in, and/or connected, to any portion of the conveyor station 100.

The controller 308 may include an indicator 312 and a switch 310 (e.g., a knob, a button, a handle, a lever, a key, a control, a disk, a dial, a joystick, etc.). The controller 308 may be electrically connected to the transceiver 130(1) via a cable 314. The controller 308 may be electrically connected to the transceiver 130(2) via a cable 316. In other embodiments, the controller 308 may be connected to the transceivers 130(1)/130(2) via a wireless connection, such as WiFi, Bluetooth, etc.

In some examples, the conveyor station 100 may include one or more indicators (e.g., the indicator 312 and/or one or more other indicators) of various types. The indicator(s) may be visual (e.g., optical) indicator(s) (e.g., one or more of an LED, a condensed fluorescent light (CFL) bulb, an incandescent light bulb, etc.) to output light and/or audible indicator(s) (e.g., a speaker, a siren, a bell, a buzzer, etc.) to output sound (e.g., buzzes, beeps, or some other audible warning). In some examples, the indicator(s) (e.g. the indicator 312) may be activated (e.g., caused to emit light) by the controller 308 while no small objects (e.g., the object 318, as illustrated in FIG. 3B, and discussed below, foreign objects, etc.) are detected, based on the controller 308 operating in an "always on" mode. The indicator(s) (e.g. the indicator 312) may be activated, based on a motor causing operation of the belt 108 to transport the container(s). Activation of the indicator(s) may be maintained based on the container(s) being detected by the transceivers 130(1)/130(2) (e.g., activation of the indicator(s) may be maintained based on the transceivers 130(1)/130(2) not detecting any small objects). Additionally or alternatively, one or more other indicator(s) (e.g. the visual indicator(s), the audible indicator(s), etc.) may be activated (e.g., the visual indicator(s) being caused to emit light, the audible indicator(s) being caused to emit sound, etc.) by the controller 308, based on one or more small objects (e.g., the object 318, one or more foreign objects, etc.) being detected. Additionally or alternatively, the controller 308 may cause the conveyor station 100 to change a speed of the belt 108 (e.g., slow or stop the belt) when the small objects are detected. By slowing the belt 108, any potential damage to the system caused by abruptly stopping the belt 108 may be avoided. The belt 108 being slowed may also be increased overall health and longevity of the conveyor station 100, in comparison to stopping the belt 108.

The controller 308 may supply power to the transceiver 130(1) via the cable 314. The controller 308 may supply power to the transceiver 130(2) via the cable 316. The power supplied to the transceivers 130 may be utilized by the transceivers 130 to emit the light beams. Provided that the transceivers 130(1)/130(2) are connected to the controller 308 via a wireless connection, another component of the system may provide power to the transceivers 130(1)/130(2), or the transceivers may be operated by one or more batteries.

The controller 308 may receive signals from the transceiver 130(1) via the cable 314. The controller 308 may receive signals from the transceiver 130(2) via the cable 316. The signals received from the transceivers 130 may be associated with the reflected light beams received by the transceivers. The light beams that are transmitted by the transceivers 130 may be reflected back, as reflected beams, to the transceivers 130 by the reflective surfaces 132. The controller 308 may receive signals based on the reflected beams being received by the transceivers 130. The controller 308 may receive no signals based on the reflected beams not being received by the transceivers 130. The controller 308 may determine the light beams transmitted by the transceivers 130 are not interrupted (e.g., that the transceivers 130 continued receiving the light beams) based on the signals being received from the transceivers 130. The controller 308 may determine the light beams transmitted by the transceivers 130 are interrupted based on the signals not being received from the transceivers 130.

In some examples, the controller 308 may determine, based on one or more signals received from the transceivers 130, that 1) the first light beam transmitted by the transceiver 130(1) is reflected by the reflective surface 132(1) and received by the transceiver 130(1); and 2) the second light beam transmitted by the transceiver 130(2) is reflected by the reflective surface 132(2) and received by the transceiver 130(2). The controller 308 may cause the conveyor device 102 to maintain a speed of the belt 108 (e.g., maintain transportation of one or more objects (e.g., the tote 306)) based on both of the light beams being received by the transceivers 130. In some examples, the controller 308 may, based on one or more signals received from the transceivers 130, determine that 1) the first light beam transmitted by the transceiver 130(1) is interrupted and not received by the transceiver 130(1); and 2) the second light beam transmitted by the transceiver 130(2) is interrupted and not received by the transceiver 130(2). The controller 308 may cause the conveyor device 102 to maintain a speed of the belt 108 (e.g., maintain transportation of one or more objects (e.g., the tote 306)) based on both of the light beams being interrupted, and not received, by the transceivers 130.

Although the term "one or more signals" is utilized to indicate signal(s) that may be received by the transceivers 130 and utilized to determine whether to maintain, or change a speed, of the belt 108, as discussed in this disclosure, this term is used for convenience of explanation. Any other term, such as an "indication" or "one or more indications" may be utilized to represent, and/or refer to, any number of signals received by the controller (e.g., the controller 308) and from one or more of the transceivers (e.g., the transceivers 130). The signal(s) may be received based on various configurations of the transceivers (e.g., the transceivers 130) and the controller 108. The various terms, including "one or more signals," "indication," "one or more indications," etc., as utilized throughout this disclosure, may indicate the controller 308 determining, based on the signal(s), which objects, and/or which types of the objects, are being transported on the belt 108. In some examples, the term "one or more indications," as utilized throughout this disclosure, may refer to one or more corresponding signals being received by the controller 308, the signals including a first signal that is received from the transceiver 130(1) and a second signal that is received from the transceiver 130(2). In other examples, the term "indication," as utilized throughout this disclosure, may refer to information processed by the controller 308, and/or the indication that is determined based on, the signal(s).

Although the signal(s) (e.g., indication) are utilized to indicate signal(s) that may be received by the transceivers 130 and utilized to determine whether to maintain, or change a speed, of the belt 108 as discussed in this disclosure, it is not limited as such. In some examples, an indication may be determined by the controller 308, based on the signal(s) received from the transceivers 130. The indication may be utilized by the controller 308 to determine whether which signals are received from one or more of the transceivers (e.g., the transceivers 130).

In some examples, the controller 308 may be utilized to operate the conveyor station 100 as a stand alone controller. In other examples, one or more conveyor stations (e.g., the conveyor station 100) may be operated by the controller 308 and one or more other controllers/devices that interoperate. The controller 308 may communicate with one or more other controllers (e.g., other controller(s) implemented similarly as the controller 308), the computing device(s) 510, and/or the management system 512, as illustrated in FIG. 5 and discussed below.

In some examples, the controller 308 may control the indicator 312 in an "always on" mode. The indicator 312 being illuminated (as shown) while the controller 308 is operating in the always on mode may be utilized to indicate a normal mode of operation associated with the conveyor station 100 (e.g., the conveyor device 102). The normal mode of operation may be associated with no objects (e.g., no small objects or containers) being detected by the controller 308. The controller 308 may detect that no objects are moving on the belt 108 based on no interruptions of the light beams.

The normal mode of operation may be associated with containers being detected by the controller 308. The controller 308 may detect the containers based on determining interruption of both of the light beams transmitted by the transceivers 130. Interruptions of both light beams determined by the controller 308 may include an interruption of the light beam transmitted by the transceiver 130(1) followed by an interruption of the light beam transmitted by the transceiver 130(2). The controller 308 may determine a delay (e.g., a time difference) between the interruption of the light beam transmitted by the transceiver 130(1) and the interruption of the light beam transmitted by the transceiver 130(2). The controller 308 may determine the tote 306 is moving on the belt 108 based on the delay being less than a threshold delay.

In some examples, the controller 308 may cause, at a first time, a motor (e.g., a DC motor) of the conveyor device 102 to operate the belt 108 to move based on the transceiver 130(1) receiving a light beam (e.g., a first light beam) and on the transceiver 130(2) receiving a light beam (e.g., a second light beam). The motor may be controlled, at the first time, to operate the belt 108 during the normal mode of operation. The belt 108 may continue operating to move containers on the belt 108, based on no small objects (e.g., the object 318, as illustrated in FIG. 3B, and discussed below) being detected by the controller 308.

The controller 308 may detect, at a second time different than the first time, an object (e.g., the object 318). The detected object may be different from the container (e.g., the tote 306). The object may be detected on the belt 108, based on the transceiver 130(1) receiving the first light beam and on the transceiver 130(2) ceasing to receive the second light beam. The transceiver 130(1) may receive the first light beam, notwithstanding the transceiver 130(2) ceasing to receive the second light beam, due to the height of the object 318 being less than the height of the transceiver 130(1). The controller 308 may determine the object detected is a different type than for the containers (e.g., the container 306), based on the transceiver 130(1) receiving the first light beam (e.g., the transceiver 130(1) does not receive the first light beam when the container 306 is moving on the belt, due to the height of the container being greater than the height of the transceiver 130(1)). In other words, because small objects do not interrupt the light beam received by the higher transceiver 130(1), the small objects are detected by the controller 308 based on interruption of only the light beam received by the lower transceiver 130(2).

In some examples, the controller 308 may determine that the conveyor station 100 is operating in a manual mode (e.g., a mode set by an operator, as discussed below). The controller 308 may cause the indicator 312 to turn off based on detection of a second object (e.g., another object similar to the object 318). The controller 308 may determine, at a third time, that a switch (e.g., the switch 310 or another mode switch of the controller 308) has been changed, by an operator, to an "off mode". The controller 308 may determine, at a fourth time subsequent to the third time, that the switch has been changed, by the operator, to an "on mode". The controller 308 may cause the indicator 312 to turn on, based on the switch being changed to the on mode.

In some examples, the controller 308 may determining that the conveyor station 100 is operating in an "automatic mode". The controller 308 may cause, at a time (e.g., a third time), the switch (e.g., the switch 310 or another mode switch of the controller) to change to the off mode based on detecting the object 318. The controller 308 may cause the motor to cease operating based on the switch being in the off mode. The controller 308 may cause, at a time (e.g., a fourth time) subsequent to the third time, the indicator to turn on (e.g., be illuminated), based on the switch being changed, by an operator, to the on mode.

Although the controller 308 may control the indicator 312 in an "always on" mode as discussed in this disclosure, it is not limited as such. The controller 308 may control one or more indicators (e.g., visual indicator(s) (e.g., the indicator 312), audible indicators, etc.) in an "always off" mode. The indicator(s) (e.g., the indicator 312) may be illuminated while the controller 308 is operating in the "always off" mode based on detection of one or more small objects (e.g., the object 318, discussed below in FIG. 3B, foreign object(s), etc.).

Therefore, and as described herein, a first transceiver/reflective surface pair (e.g., the transceiver 130(1) and the reflective surface (132(1)) and a second transceiver/reflective surface pair (e.g., the transceiver 130(2) and the reflective surface (132(2)) may be positioned at different heights above the conveyor device 102. The first transceiver/reflective surface pair that is higher than the second transceiver/reflective surface pair detects containers (e.g., the tote 306), but not small objects. The second transceiver/reflective surface pair may detect both the tote 306 and any small objects. The controller 308 may detect the tote 306 that is being transported by the belt 108 based on interruption of both the light beam associated with first transceiver/reflective surface pair and the second transceiver/reflective surface pair. The controller 308 may operate in response to detecting the tote 306 being transported by maintaining illumination of the indicator 312.

FIG. 3B illustrates the conveyor device 102, as illustrated in FIG. 3A but with an object 318 (e.g., a small object (e.g., a screwdriver)) moving on the belt instead of the tote 306. Unlike in FIG. 3A, the indicator 312 is not illuminated.

The transceiver 130(2) may be at a height (e.g., a second height) allowing the transceiver 130(2) to emit the light beam above the belt 108, as discussed above. The height may be a distance (e.g., a second distance) between the top surface of the conveyor device 102 and the transceiver 130(2), in a vertical direction (e.g., a direction along the z-axis)).

In some examples, the indicator 312 not being illuminated (as shown), or being silent, may be used to indicate the operation of the conveyor station 100 is not in the normal mode. The indicator 312 not being illuminated while the controller 308 is operating in the always on mode may be utilized to indicate detection of the object. In some examples, the operation not being in the normal mode may include a "small object detected mode". The small object detected mode may be associated with the signal from the transceiver 130(1) being received by the controller 308 while the signal from the transceiver 130(2) is not received. The signal being received from the transceiver 130(1) may be based on the transceiver 130(1) receiving the light beam (e.g., the light beam that is transmitted and reflected by the reflection surface 132(1) back towards the transceiver 130(1)). The signal not being received from the transceiver 130(2) may be based on the transceiver 130(2) not receiving the light beam (e.g., the light beam that is transmitted, but not reflected by the reflection surface 132(2) back towards the transceiver 130(1), and/or not received by the transceiver 130(2)). The light beam not being received by the transceiver 130(2) may be based on the light beam being interrupted by the object 318.

In some examples, the controller 308 may, based on one or more signals received from the transceivers 130, determine that 1) a first light beam transmitted by the transceiver 130(1) is reflected by the reflective surface 132(1) and received by the transceiver 130(1); and 2) a second light beam transmitted by the transceiver 130(2) is reflected by the reflective surface 132(2) and received by the transceiver 130(2). The controller 308 may cause the conveyor device 102 to maintain a speed of the belt 108 (e.g., maintain transportation of one or more objects (e.g., the tote 306)) based on both of the light beams being received by the transceivers 130. In some examples, the controller 308 may, based on one or more signals received from the transceivers 130, determine that 1) the first light beam transmitted by the transceiver 130(1) is reflected by the reflective surface 132(1) and received by the transceiver 130(1); and 2) the second light beam transmitted by the transceiver 130(2) is interrupted and not received by the transceiver 130(2). The controller 308 may cause the conveyor device 102 to change a speed of the belt 108 to slow a rate of, or stop, the belt 108, based on the first light beam being received by the transceiver 130(1), and on the second light beam not being received by the transceiver 130(2). The first light beam being received by the transceiver 130(1), and the second light beam not being received by the transceiver 130(2) may be utilized by the controller 308 to determine the object 318 is on the belt 108.

Although the speed of the belt 108 may be changed based on the controller 308 determining the object 318 is on the belt 108 as discussed in this disclosure, it is not limited as such. Any other functions (e.g., automatic removal of the object, activation of indication(s), etc.) performed based on the controller 308 determining the object 318 is on the belt 108 as discussed throughout this disclosure, may be performed, in addition or alternatively, to the speed of the belt 108 being changed. In some examples, the controller 308 may, at a subsequent time and after determining the switch 310 is activated by an operator, change the speed of the belt 108 to increase and/or to resume at a "normal" speed (e.g., a speed of the belt 108 utilized based on activation (e.g., "turning on") of the conveyor device 102). In other examples, the controller 308 may, at a subsequent time after receiving a signal indicating the object 318 has been automatically removed from the belt (e.g., a signal indicating a removal arm has caused the object 318 to be removed from the belt 108), change the speed of the belt 108 to increase and/or to resume at the "normal" speed. The signal indicating the removal arm has caused the object 318 to be removed from the belt 108 may be received from one or more controllers that operate the removal arm (e.g., control operation of the removal arm).

As discussed above, interruptions of both light beams determined by the controller 308 may be utilized to detect object(s) (e.g., the tote 306), based on a delay (e.g., a time difference). The controller 308 may determine the tote 306 is moving on the belt 108 based on a signal (e.g., one or more signals received from the transceivers 130) (e.g., or an indication associated with the signal(s)), indicating the delay. The controller 308 may determine, based on the indication, that the delay is occurring between the interruption of the light beam transmitted by the transceiver 130(1) and the interruption of the light beam transmitted by the transceiver 130(2). The controller 308 may determine the tote 306 is moving on the belt 108 based on the delay being less than a threshold delay. The delay being less than the threshold delay may indicate that the tote 306 was moving on the belt 108, based on the delay being associated with a lower portion of the tote 306 causing interruption of the light beam received by the transceiver 130(2) at a different time than an upper portion of the tote 306 causing interruption of the light beam received by the transceiver 130(1). The controller 308 may determine interruption of the light beam received by the transceiver 130(2) at a first time and interruption of the light beam received by the transceiver 130(1) at a second time, the first time being different from the second time due to the delay (e.g., a time difference between the first time and the second time). The delay being less than the threshold delay may be associated with the lower portion of the tote 306 being a different size (e.g., smaller) than an upper portion of the tote 306. The controller 308 may cause a speed (e.g., a rate of movement) of the belt 108 to be maintained based on the time difference being less than the threshold time difference.

Interruptions of both light beams determined by the controller 308 may be utilized to detect objects (e.g., small objects), based on the delay (e.g., the time difference). The controller 308 may determine the small object is moving on the belt 108 based on the delay between the interruption of the light beam transmitted by the transceiver 130(1) and the interruption of the light beam transmitted by the transceiver 130(2). The controller 308 may determine the small object is moving on the belt 108 based on the delay meeting or exceeding a threshold delay. The delay meeting or exceeding the threshold delay may indicate that the tote 306 was moving on the belt 108, and either preceded or succeeded by the object 318.

An operator (e.g., user) of the conveyor belt may respond to the object 318 being detected by slowing and/or stopping the belt 108. The operator may utilize (e.g., operate) the switch 310 and/or one or more of the tripping mechanism(s) 506, discussed below, to stop the belt 108.

In some examples, the indicator 312 not being illuminated may be used to indicate the operation of the conveyor station 100 is not in the normal mode. The operation not being in the normal mode may include "a power outage mode". The power outage mode may be associated with the power not being supplied to the controller 308.

In some examples, the controller 308 may operate with a processing speed to detect objects with a height that is greater than 5 mm and with a length that is greater than 3 mm. The processing speed of the controller may allow detection of any objects satisfying those dimensions and moving up to 3 meters per second (m/s).

Therefore, and as described herein, only one of the first transceiver/reflective surface pair (e.g., the transceiver 130(1) and the reflective surface (132(1)) and the second transceiver/reflective surface pair (e.g., the transceiver 130(2) and the reflective surface (132(2)) may detect small objects (e.g., the object 318). A height of the first transceiver/reflective surface pair may be greater than a height of the second transceiver/reflective surface pair. While the first transceiver/reflective surface pair may detect only containers, the second transceiver/reflective surface pair may detect both containers (e.g., the tote 306) and the object 318. The controller 308 may determine that the object 318 has fallen onto the belt 108 based on interruption of only the light beam associated with the second transceiver/reflective surface pair. The controller 308 may operate in response to detecting the object 318 by ceasing to illuminate the indicator 312, or by causing emission of a warning sound by other indicators.

FIG. 3C illustrates the conveyor device 102, as illustrated in FIG. 3A but with one or more trays (e.g., a tray 320) moving on the belt instead of the tote 306. As illustrated in FIG. 3A, the indicator 312 is illuminated.

Although the term "tray" is utilized, for convenience of explanation, in FIG. 3C and throughout this disclosure, it is not limited as such. The term "tray" may refer to any bin, container, box, bag, tray, etc. In some examples, the term "tray" may refer to an object that is smaller (e.g., shorter) than the object referred to by the term "tote."

Unlike in FIG. 3A, the transceiver 130(1) and the reflective surface 132(1) may be at a height 322 (e.g., a third height) that allows the transceiver 130(1) to detect the tray 320 on the belt 108. The height 322 associated with the transceiver 130(1) may be the same as a height 324 associated with the tray 320. A difference between a height of the tray 320 and the height 324 (e.g., the distance between the top surface of the conveyor device 102 and a location near the top of the tray 320) may less than a predetermined distance (e.g., 1 mm, 5 mm, 10 mm, 15 mm).

The normal mode of operation may be associated with the tray 320 being detected by the controller 308. The controller 308 may detect the tray 320 based on determining interruption of both of the light beams transmitted by the transceivers 130. Interruptions of both light beams determined by the controller 308 may include an interruption of the light beam transmitted by the transceiver 130(1) followed by an interruption of the light beam transmitted by the transceiver 130(2). The controller 308 may determine a delay (e.g., a time difference) between the interruption of the light beam transmitted by the transceiver 130(1) and the interruption of the light beam transmitted by the transceiver 130(2). The controller 308 may determine that the tray 320 is moving on the belt 108 based on the delay being less than a threshold delay.

Therefore, and as described herein, both of the first transceiver/reflective surface pair (e.g., the transceiver 130(1) and the reflective surface (132(1)) and the second transceiver/reflective surface pair (e.g., the transceiver 130(2) and the reflective surface (132(2)) may detect containers (e.g., the tray 320). The controller 308 may detect the tray 320 that is being transported by the belt 108 based on interruption of both the light beam associated with first transceiver/reflective surface pair and the second transceiver/reflective surface pair. The controller 308 may operate in response to detecting the tray 320 being transported by maintaining illumination of the indicator 312. In some examples, a height of the first transceiver/reflective surface pair and a height of the second transceiver/reflective surface pair used to detect the tote 306 may be greater than for the tray 320. The first transceiver/reflective surface pair may be adjusted to change from detecting the tote 306 to the tray 320, or vice versa. A height of first transceiver/reflective surface pair may be set at any desired height for any container being transported on the belt 108.

In some examples, one or more pairs of brackets may be connected to the conveyor device 102. In those examples, one or more pairs of bracket assemblies may be connected to the conveyor device 102. The bracket assembly pairs may be connected and implemented similarly as for the bracket assembly pair (e.g. the bracket assemblies 202/204), illustrated in FIG. 2 and discussed above. Each bracket assembly pair may be utilized to detect any types of containers being transported on the belt 108. In some examples, one bracket assembly pair may be implemented to detect one or more totes (e.g., the tote 306) (e.g., a height of the first transceiver/reflective surface pair may be set at a height associated with detecting the tote 306), while another bracket assembly pair may be implemented to detect one or more trays (e.g., the tray 320) (e.g., a height of the first transceiver/reflective surface pair may be set at a height associated with detecting the tray 320). One or more of the bracket assembly pairs may be controlled by a same controller (e.g., the controller 308), or by one or more one or more other controllers (e.g., other controller(s) implemented similarly as the controller 308), the computing device(s) 510, and/or the management system 512, as illustrated in FIG. 5 and discussed below. The bracket assembly pair may be controlled, individually or in combination by one or more of the controller(s)/device(s)/system(s) discussed here.

Figure 4:
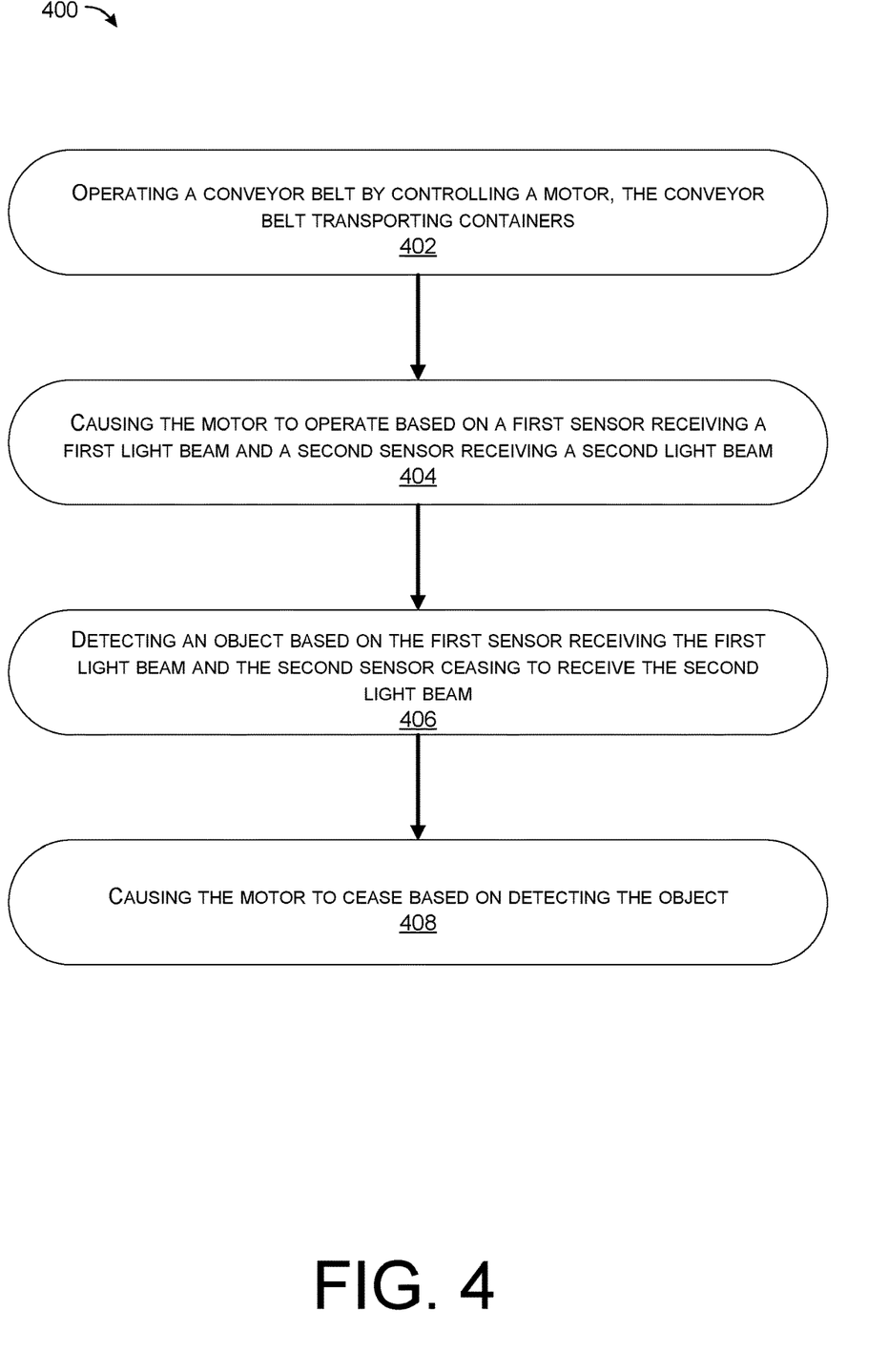
FIG. 4 is a flow diagram of an illustrative process for a monitoring system with brackets and sensors for a conveyor system.

FIG. 4 is a flow diagram 400 of an illustrative process for a monitoring system with brackets and sensors for a conveyor system.

At block 402, the process includes operating a conveyor belt in a conveyor device by controlling a motor. The conveyor belt may transport containers containing items from a first end of a conveyor station to a second end of the conveyor station.

At block 404, the process includes causing, at a first time, the motor to operate the conveyor belt to move based on a first sensor device receiving a first light beam reflected by a first reflective surface and on a second sensor device receiving a second light beam reflected by a second reflective surface. The first sensor device and the second sensor device may be connected to a bracket. The bracket may be connected a first side surface of the conveyor device.

At block 406, the process includes detecting, at a second time different than the first time, an object, different from the containers, on the conveyor belt. The object may be detected based on the first sensor device receiving the first light beam and on the second sensor device ceasing to receive the second light beam.

At block 408, the process includes causing the motor to cease operating the conveyor belt based on detecting the object. Additionally or alternatively to operation of the motor being caused to cease, the belt 108 may be slowed and a robotic arm may be controlled to remove the object. In other embodiments, an individual may manually remove the object from the belt 108.

Figure 5:
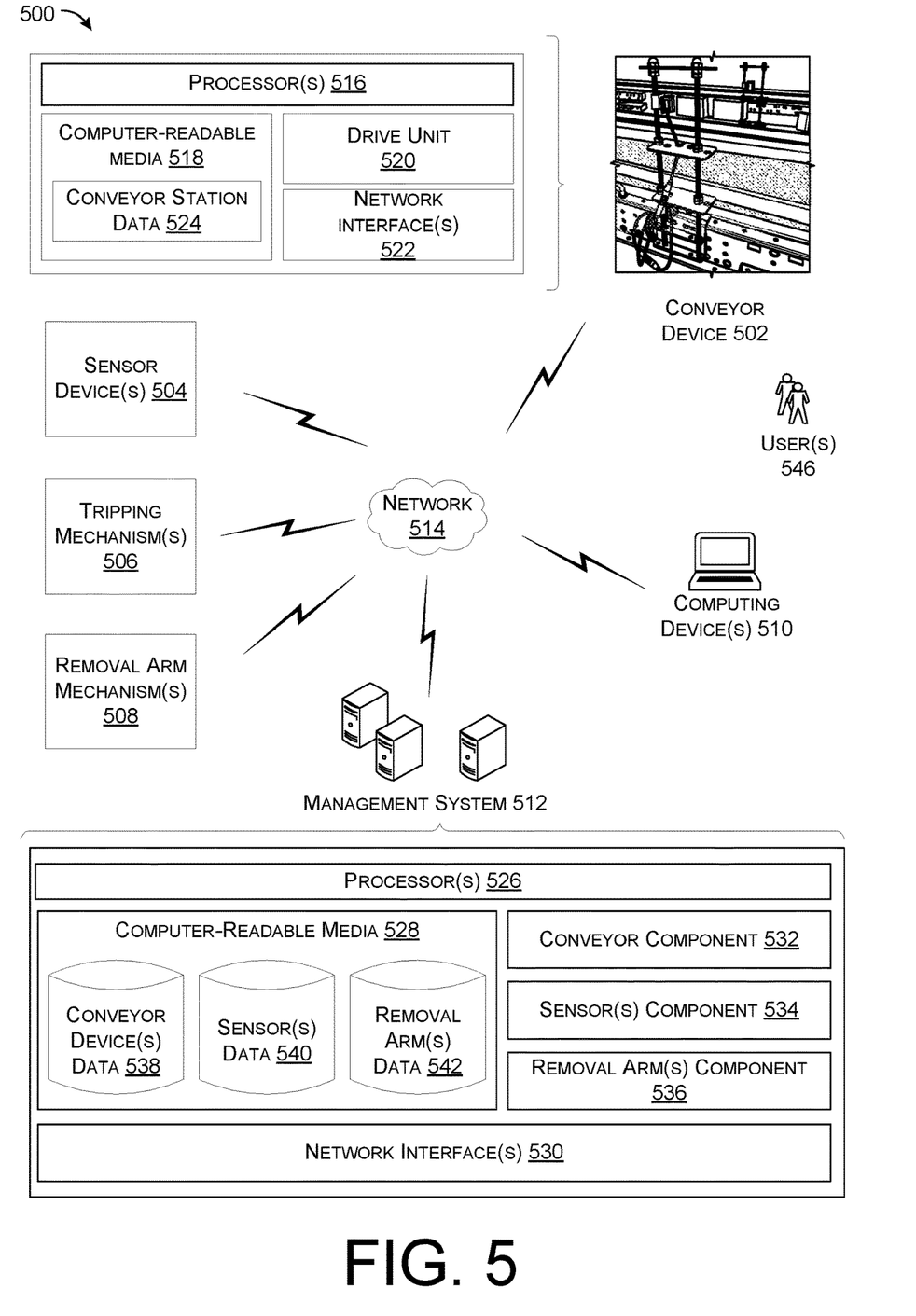
FIG. 5 is an example system architecture for a monitoring system with brackets and sensors for a conveyor system.

FIG. 5 is an example system architecture 500 for a monitoring system with brackets and sensors for a conveyor system. The system includes a conveyor device 502, one or more sensor devices 504, one or more tripping mechanisms 506, one or more removal arm drive mechanisms 508, one or more computing devices 510, a management system 512, and a network 514.

As illustrated, and in some embodiments, the conveyor device 502 may include one or more processors 516, computer-readable media 518, a drive unit 520, and one or more network interfaces 522. The processor(s) 516 may perform various functions or operations associated with conveyor stations (e.g., the conveyor station 100 of FIG. 1), while the computer-readable media 518 may store instructions executable by the processor(s) 516 to store the operations described herein. The computer-readable media 518 for example may store conveyor station data 524 for performing object detection.

Generally, the conveyor device 502 may include a metal frame as well as pulleys (e.g., rollers) at each end of a flat metal body. The conveyor device 502 may include a belt (e.g., a rubber belt) (e.g., the belt 108 of FIG. 1) to move objects. The drive unit 520 may power the rollers to move the belt 108. By moving the belt 108, the conveyor device 502 may move the objects from one to another end.

The drive unit 520 may include a motor or any type of mechanical or electrical engine of sufficient size and power to move the belt 108. In some embodiments, the drive unit 520 includes an electrical motor.

The conveyor device 502 further includes the network interface(s) 522 to communicate with the sensor device(s) 504 (e.g., the transceivers 130 of FIG. 1), the tripping mechanism(s) 506, the removal arm mechanism(s) 508, the computing device(s) 510, and the management system 512. The network interface(s) 522 enables access to one or more types of networks, including wired and wireless networks. When implemented as a wireless unit, the network interface(s) 522 use an antenna to send and receive wireless signals. In some embodiments, the conveyor device 502 may communicatively couple to the computing device(s) 510 and/or the management system 512 using one or more communication channel(s), or network(s), such as Bluetooth (e.g., 802.11), Bluetooth Low Energy (BLE), ZigBee (e.g., 802.15.4), Z-wave, Wi-Fi), or the like.

The sensor(s) device 504 of the conveyor station 100 may be used to detect objects on the belt 108. The detecting of the containers (e.g., the tote 306 or the tray 320) may be used to illuminate indicators (e.g., the indicator 312) while the conveyor station 100 operates in normal mode. The detecting of the small objects (e.g., the object 318) may be used to cease illuminating the indicator 312. The indicator 312 may be controlled to cease illuminating based on the object 318 interrupting a light beam of one of the sensor device(s) 504 but not another one of the sensor device(s) 504. For example, the indicator 312 may be controlled to cease illuminating based on the object 318 interrupting a light beam of one of the transceiver 130(2) but not the transceiver 130(1).

The tripping mechanism(s) 506 may include one or more of trip cords, belt sway switches, speed switches, belt rip switches, and emergency stops. The trip cords may be positioned along a length of the conveyor device 102. The belt sway switch may be used to stop the conveyor if an alignment of the belt 108 along the structure is lost. The speed switch may be used to stop the belt if the speed switch is not registering that the belt 108 is running at a required speed. The belt rip switch may be used to stop the belt 108 based on the belt 108 having a cut or a flap. The emergency stop may be located at a conveyor control box as a backup in case in which a malfunction of the trip chord occurs. In some examples, the trip mechanism(s) 506 may be used based on illumination of the indicator 312 ceasing.

The removal arm mechanism(s) 508 may be utilized to control an arm associated with the belt 108. The removal arm may be controlled to remove any objects from the belt 108. The removal arm may sweep across the belt 108 to move objects off of the belt 108. In some examples, the removal arm may utilize a claw or grabbing assembly to lift objects from the belt. The removal arm mechanism(s) 508 may be utilized alternatively, or in addition to, the tripping mechanism(s) 506. The removal arm mechanism(s) 508 may be operated utilizing similar operating conditions as for the tripping mechanism(s) 506. The removal arm mechanism(s) 508 and/or the tripping mechanism(s) 506 may be utilized based on the object 318 being detected. The removal arm mechanism(s) 508 and the tripping mechanism(s) 506 may be utilized, individually or in combination. In some embodiments, the removal arm mechanism(s) 508 may operate in a fully automated manner, a partially automated manner, or may be manually controlled/operated by one or more individuals.

In particular, the removal arm mechanism(s) 508 may operate automatically by detecting a position of an object (e.g., the object 318), grabbing the object, and moving the object off of the belt 108. In other examples, the removal arm mechanism(s) 508 may be controlled (e.g., locally or remotely controlled) by an operator, via one or more of the computing device(s) 510 and the management system 512.

The network 514 may represent any type of communication network, including a data network, and may be implemented using wired infrastructure (e.g., cable, CAT5, fiber optic cable, etc.), a wireless infrastructure (e.g., RF, cellular, microwave, satellite, Bluetooth, etc.), and/or other connection protocols.

The management system 512 may include processor(s) 526, computer-readable media 528, network interface(s) 530, a conveyor component 532, a sensor(s) component 534, and a removal arm(s) component 536. The processor(s) 526 may perform various functions or operations associated with detecting objects on the conveyor belt, while the computer-readable media 528 may store instructions executable by the processor(s) 526 to store the operations described herein.

As used herein, a processor, such as processor(s) 516 and/or the processor(s) 526 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The computer-readable media 518 and/or the computer-readable media 528 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

As illustrated the computer-readable media 528 may store several database(s). In some examples, the computer-readable media 528 may store a conveyor device database 538, a sensor(s) database 540, and a removal arm database 542.

The network interface(s) 530 may permit the management system 512 to receive sensor data from the sensor(s) database 540. The sensor data that is received via the network interface(s) 530 may be routed to, and stored in, the sensor(s) database 540. The network interface(s) 530 may permit the management system 512 to communicate with the conveyor device 502 and/or the computing device(s) 510.

The conveyor component 532 may determine the operation mode for the conveyor device 502. The conveyor component 532 may control the conveyor device 502 to operate in the normal mode of operation. The conveyor component 532 may control the conveyor device 502 to cease operating in the normal mode of operation, based on one or more small objects (e.g., the object 318) being detected. The conveyor component 532 may control the conveyor device 502 to cease operating in the normal mode of operation based on a signal from any of the tripping mechanism(s) 506. The conveyor component 532 may control the conveyor device 502 to cease operating in the normal mode of operation based on power supply to a controller (e.g., the controller 308) of the conveyor device 502 being lost.

The conveyor component 532 may determine whether the conveyor device 102 is operating in a manual mode or an automatic mode. The manual mode or the automatic mode may be set by one or more of the controller 308, the computing device(s) 510, and the management system 512. The controller 308, the computing device(s) 510, and/or the management system 512 may be controlled by an operator (e.g., one or more users 546) of the system.

The sensor(s) component 534 may determine the operation mode for the sensor device(s) 504. The sensor(s) component 534 may operate the sensor device(s) 504 to be active. By operating the sensor device(s) 504 to be active, the sensor device(s) 504 may emit light beams. The sensor device(s) 504 may determine whether the light beams are reflected back towards the sensor device(s) 504.

The conveyor device database 538 may identify conveyor devices (e.g., the conveyor device 102) of conveyor stations (e.g., the conveyor station 100) and statuses of the conveyor devices. For example, the conveyor device database 538 may store statuses of the conveyor device 102 that was stopped from operating based on one or more detected objects.

The sensor(s) database 540 may store statuses of the sensor(s) device 504 of the conveyor stations. The statuses may be associated with the sensor(s) device 504 detecting objects on the belt 108. The statuses may be used to illuminate indicators (e.g., the indicator 312) while the conveyor stations operate in normal mode. The indicator 312 may be controlled to cease illuminating based on an object being detected that interrupts a light beam of one of the sensor device(s) 504 but not another one of the sensor device(s) 504. For example, the indicator 312 may be controlled to cease illuminating based on an object being detected that interrupts a light beam of one of the transceiver 130(2) but not the transceiver 130(1).

The removal arm(s) database 542 may identify removal arms of conveyor stations and statuses of the removal arms. For example, the removal arm(s) database 542 may store statuses of the removal arms that were operated to remove objects detected on the belt 108.

Although the term "user" and "individual" are utilized throughout this disclosure, it is not limited as such and the term "user" is utilized for simplicity. The term "user" as used throughout disclosure may denote any type of user, including a user, an administrator, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
   a conveyor station comprising:
      a conveyor device, with a motor to operate a conveyor belt that transports containers containing items from a first end of the conveyor station to a second end of the conveyor station;
      a first bracket connected to a first side surface of the conveyor device, the first bracket comprising a first rod, a second rod, and a first plate that is connected to the first rod and the second rod;
      a first transceiver connected to the first rod;
      a second transceiver connected to the first rod;
      a second bracket connected to a second side surface of the conveyor device that is opposite the first side surface, the second bracket comprising a third rod, a fourth rod, and a second plate that is connected to the third rod and the fourth rod, the containers being transported by the conveyor belt between the first bracket and the second bracket;
      a first reflective surface connected to the third rod and corresponding to the first transceiver;
      a second reflective surface connected to the third rod and corresponding to the second transceiver; and
      a conveyor controller configured to control the motor; and
   a computing device comprising:
      one or more processors; and
      one or more computer-readable media storing computer-executable instructions that, when executed by the one or more processors, cause the one or more processors to perform acts comprising:
        causing the first transceiver to emit a first light beam that is reflected by the first reflective surface back towards the first transceiver;
        causing the second transceiver to emit a second light beam that is reflected by the second reflective surface back towards the second transceiver;
        causing, at a first time, the motor to operate the conveyor belt to move based on the first transceiver receiving the first light beam and on the second transceiver receiving the second light beam; and
      causing, at a second time different than the first time, the motor to cease operating the conveyor belt based on the first transceiver receiving the first light beam and on the second transceiver ceasing to receive the second light beam due to the second light beam being intercepted by the object.

2. The system of claim 1, wherein:
   the first transceiver and the first reflective surface are at a first height from a top surface of the conveyor device;
   the second transceiver and the second reflective surface are at a second height from the top surface of the conveyor device; and
   the first height is greater than the second height.

3. The system of claim 1, wherein:
a first height of a container being transported on the conveyor belt is greater than a second height of the second transceiver and the second reflective surface from the conveyor belt; and
the second height is greater than a third height of the object.

4. The system of claim 1, the conveyor controller comprising a switch and an indicator, the acts further comprising:
determining that the conveyor station is operating in a manual mode;
causing the indicator to turn off based on detection of a second object;
determining, at a third time, that the switch has been changed, by an operator, to an off mode;
determining, at a fourth time subsequent to the third time, that the switch has been changed, by the operator, to an on mode; and
causing activation of the indicator, based on the switch being changed to the on mode, the activation of the indicator including emission of light by a light emitting diode (LED) or emission of sound by a speaker.

5. The system of claim 1, the conveyor controller comprising a switch and an indicator, the acts further comprising:
determining that the conveyor station is operating in an automatic mode;
causing, at a third time, the switch to change to an off mode based on detecting the object;
causing the motor to cease operating based on the switch being in the off mode; and
causing, at a fourth time subsequent to the third time, the indicator to be illuminated or to emit a sound, based on the switch being changed, by an operator, to an on mode.

6. A system comprising:
a conveyor device that is configured to transport objects in a direction;
a first bracket connected to a first side surface of the conveyor device;
a second bracket connected to a second side surface of the conveyor device that is opposite the first side surface, the conveyor device disposed between the first side surface and the second side surface;
a first sensor device connected to the first bracket at a first position, the first sensor device configured to emit a first light beam towards a first reflective surface corresponding to the first sensor device;
a second sensor device connected to the first bracket at a second position different than the first position, the first sensor device being positioned above the second sensor device, with respect to a top surface of the conveyor device, the second sensor device configured to emit a second light beam towards a second reflective surface corresponding to the second sensor device;
the first reflective surface configured to reflect the first light beam towards the first sensor device to be received by the first sensor device; and
the second reflective surface configured to reflect the second light beam towards the second sensor device to be received by second first sensor device,
wherein lack of second receipt of the second light beam by the second sensor device indicates an unintended object being transported by the conveyor device.

7. The system of claim 6, wherein:
the first bracket comprises a first rod, a second rod, and a first plate that is connected to the first rod and the second rod; and
the first sensor device and the second sensor device are connected to the first rod.

8. The system of claim 7, wherein:
the second bracket comprises a third rod, a fourth rod, and a second plate that is connected to the third rod; and
the first reflective surface and the second reflective surface are connected to the third rod.

9. The system of claim 6, further comprising:
a conveyor belt on the conveyor device;
a motor; and
a conveyor controller configured to:
control the motor to operate the conveyor belt to transport the objects in the direction;
determine a lack of the second receipt of the second light beam by the second sensor device; and
control the motor to change a speed of the conveyor belt, based at least in part on the lack of the second receipt of the second light beam by the second sensor device, the speed being change to slow a rate of, or stop, the conveyor belt.

10. The system of claim 6, further comprising a conveyor belt on a metal frame of the conveyor device, wherein
the first sensor device and the first reflective surface are at a first height from a top surface of the metal frame;
the second sensor device and the second reflective surface are at a second height from the top surface of the metal frame; and
the first height is greater than the second height.

11. The system of claim 6, wherein:
the conveyor device includes a frame;
a first height of a container being transported on a conveyor belt positioned on the frame of the conveyor device is greater than a second height of the second sensor device, the first height being from a top surface of the frame to an upper portion of the container, the second height being a predetermined height from the top surface of the frame; and
the second height is greater than a third height of the unintended object.

12. A method comprising:
causing, via a motor, a conveyor belt associated with a conveyor device to transport one or more first objects;
receiving, by a computing device and at a first time, an indication that a first sensor device received a first light beam and a second sensor device received a second light beam, the first sensor device and the second sensor device connected to a bracket that is connected a first side surface of the conveyor device, the first sensor device being positioned above the second sensor device, with respect to a top surface of the conveyor device;
determining, by the computing device and at a second time subsequent to the first time, that a second object, different from the one or more first objects, is on the conveyor belt, based at least in part on the first sensor device receiving the first light beam and on the second sensor device ceasing to receive the second light beam; and
causing, via the motor, the conveyor belt to at least one of decrease a rate of movement or cease operating based at least in part on determining that the second object is on the conveyor belt.

13. The method of claim 12, further comprising:
receiving, at a third time subsequent to the first time and the second time, a second indication that the first sensor device ceased to receive the first light beam and that the second sensor device ceased to receive the second light beam; and
causing the rate of movement of the conveyor belt to be maintained based at least in part on the second indication.

14. The method of claim 12, further comprising:
causing activation of an indicator, based at least in part on the motor causing the conveyor belt to transport the one or more first objects; and
causing activation of the indicator to cease, based at least in part on determining that the second object is on the conveyor belt.

15. The method of claim 12, further comprising:
causing the first sensor device to emit the first light beam that is reflected by a first reflective surface corresponding to the first sensor device back towards the first sensor device; and
causing the second sensor device to emit the second light beam that is reflected by a second reflective surface corresponding do the second sensor device back towards the second sensor device.

16. The method of claim 12, further comprising:
causing activation of an indicator, based at least in part on determining that the second object is on the conveyor belt, the activation of the indicator including emission of light by the indicator or emission of sound by the indicator.

17. The method of claim 12, further comprising:
receiving, at a third time subsequent to the first time and the second time, a second indication that the first sensor device continued receiving the first light beam and that the second sensor device ceased to receive the second light beam; and
causing, via the motor, the conveyor belt to at least one of decrease the rate of movement or cease operating based at least in part on the second indication.

18. The method of claim 12, further comprising:
receiving, at a third time subsequent to the first time and the second time, a second indication that the first sensor device continued receiving the first light beam;
receiving, at a fourth time subsequent to the third time, a third indication that the second sensor device ceased to receive the second light beam; and
causing the rate of movement of the conveyor belt to be maintained based at least in part on a time difference between the third time and the fourth time being less than a threshold time difference.

19. The method of claim 12, further comprising:
determining that the conveyor device is operating in a manual mode;
causing an indicator in a conveyor controller to turn off based at least in part on detection of the second object;
determining, at a third time, that a switch in the conveyor controller has been changed, by an operator, to an off mode;
determining, at a fourth time subsequent to the third time, that the switch has been changed, by the operator, to an on mode; and
causing the indicator to be illuminated, based at least in part on the switch being changed to the on mode.

20. The method of claim 12, further comprising:
determining that the conveyor device is operating in an automatic mode;
causing, at a third time, a switch in a conveyor controller to change to an off mode based at least in part on determining that the second object is on the conveyor belt;
causing, via the motor, the conveyor belt to cease operating, based at least in part on the switch being in the off mode; and
causing, at a fourth time subsequent to the third time, an indicator to be illuminated, based at least in part on the switch being changed, by an operator, to an on mode.

* * * * *